Figure 2:
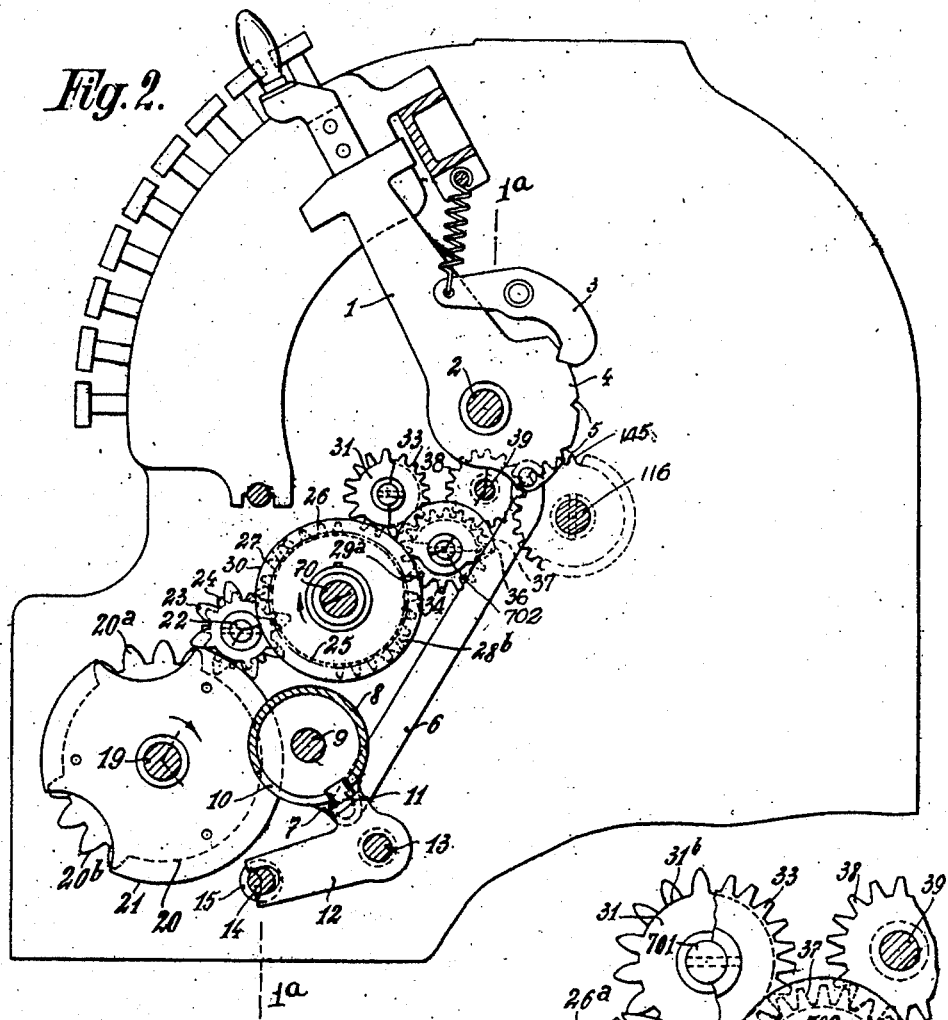

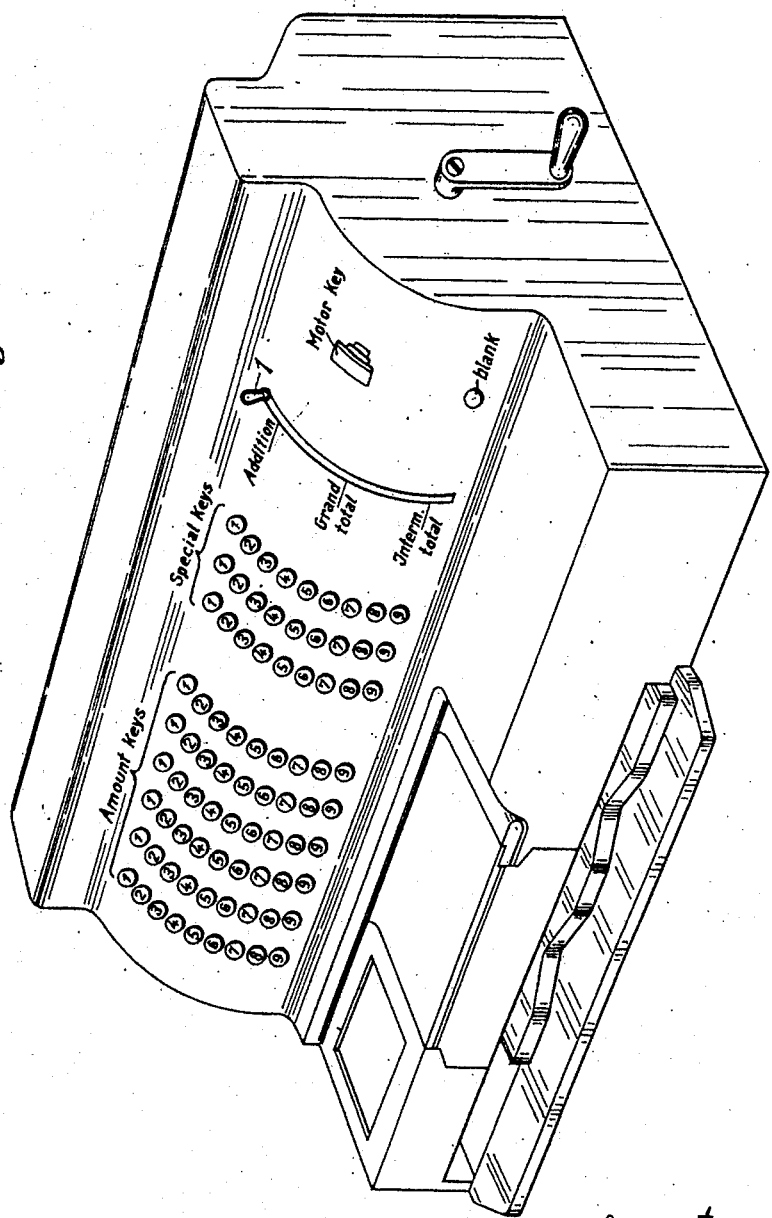

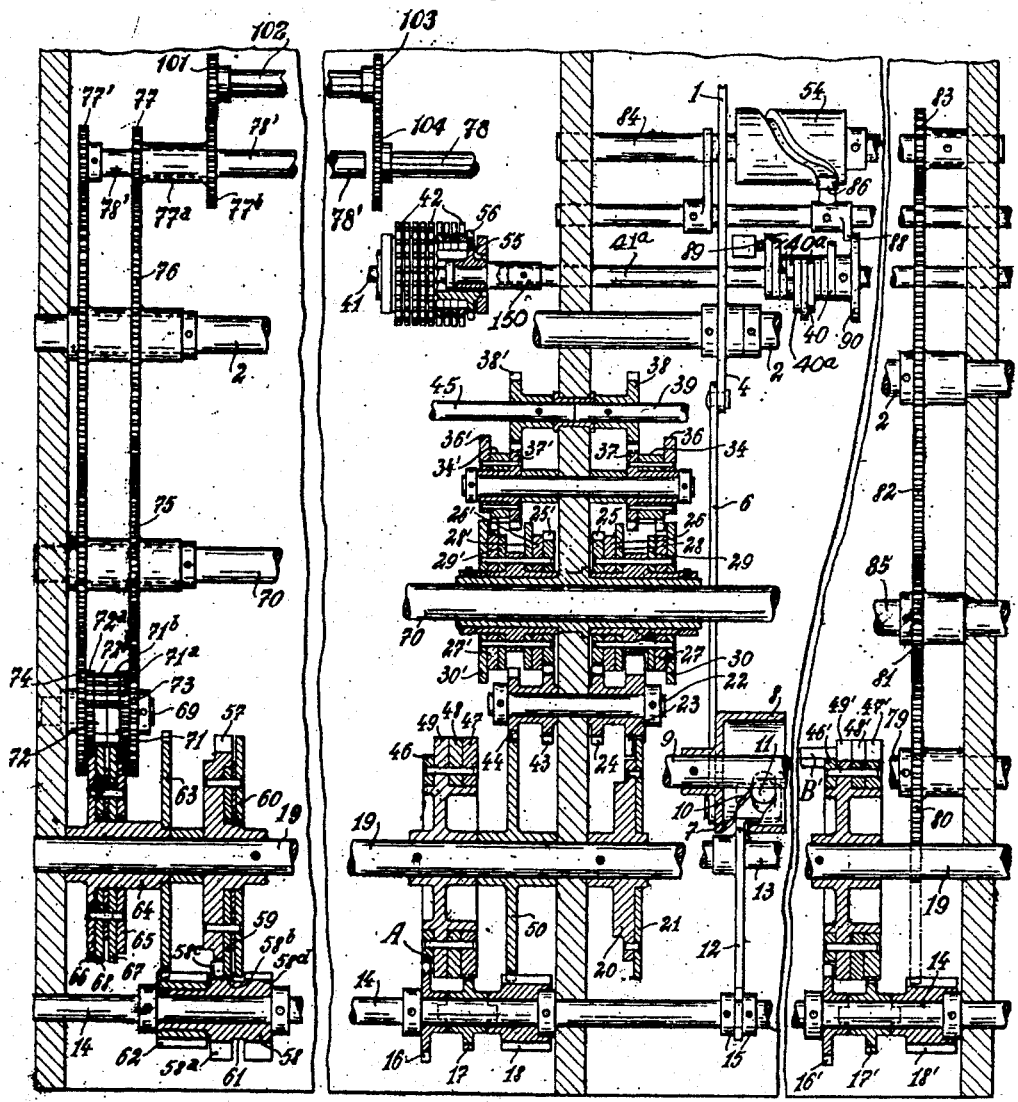
Fig. 1.ª

Dec. 15, 1936.  E. BREITLING  2,064,147

CONTROLLING MECHANISM FOR CASH REGISTERS AND CALCULATING MACHINES

Filed March 12, 1931  10 Sheets-Sheet 3

Inventor:
Ernst Breitling
By Knight Bros
attys

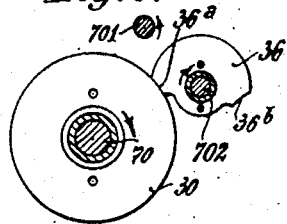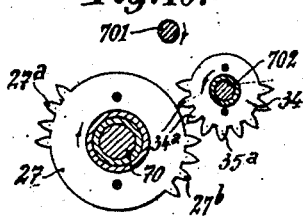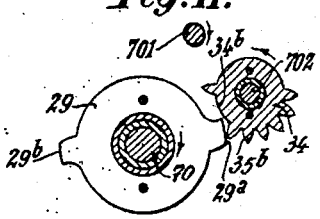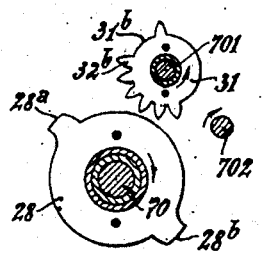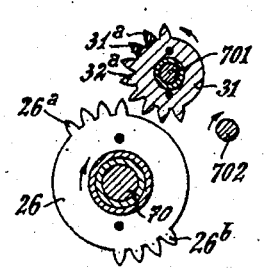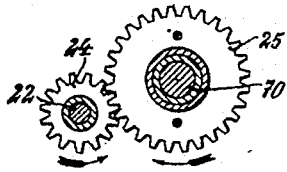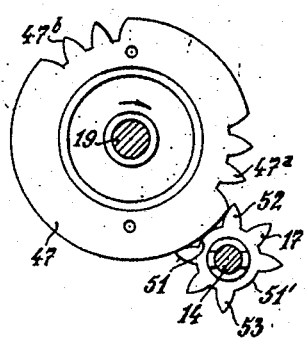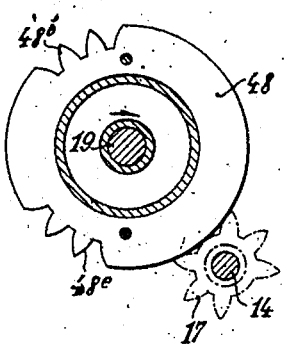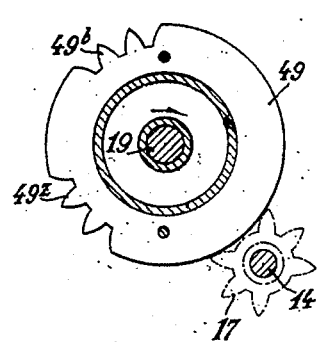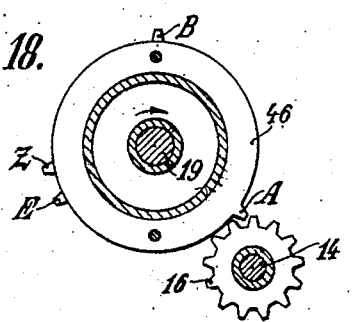

Dec. 15, 1936.  E. BREITLING  2,064,147
CONTROLLING MECHANISM FOR CASH REGISTERS AND CALCULATING MACHINES
Filed March 12, 1931  10 Sheets-Sheet 7

Inventor:
Ernst Breitling
By Knight Bros.
attys.

Dec. 15, 1936.  E. BREITLING  2,064,147

CONTROLLING MECHANISM FOR CASH REGISTERS AND CALCULATING MACHINES

Filed March 12, 1931  10 Sheets-Sheet 8

Dec. 15, 1936.                E. BREITLING                2,064,147
CONTROLLING MECHANISM FOR CASH REGISTERS AND CALCULATING MACHINES
            Filed March 12, 1931        10 Sheets-Sheet 10

Inventor
Ernst Breitling
By
His Attorney

UNITED STATES PATENT OFFICE 2,064,147

CONTROLLING MECHANISM FOR CASH REGISTERS AND CALCULATING MACHINES

Ernst Breitling, Essen, Germany, assignor, by mesne assignments, to The National Cash Register Co., Dayton, Ohio, a corporation of Maryland Application March 12, 1931, Serial No. 522,051 In Germany April 26, 1930

18 Claims. (Cl. 235—7)

The invention relates to a controlling mechanism for cash registers and calculating machines for printing single amounts, intermediate totals, and grand totals, in which the selection of the totalizers is determined by special keys and the kind of operation of the machine by a special selecting member.

In the specification of the patent application filed by Bornkessel et al. on February 2nd, 1925, Serial No. 11,373, Patent No. 1,896,936, February 7, 1933, a mechanism of this kind is disclosed which possesses only keys, and for total taking requires only one revolution of the main gear shaft. In this machine the differential introduction of the amounts and the selection of the totalizers are separate operations, but in all kinds of operation of the machine, these operations take place at the same time. As the operation of the totalizers, however, varies according to the kind of operation of the machine and, therefore, the coupling of the totalizers accordingly has to take place at different times, idle run periods arise which render it impossible to lodge in the time diagram a step-drum tens transfer operation, so that with these machines a spring-mechanism tens transfer mechanism has to be provided. The desired step-drum transfer mechanism is disclosed in my co-pending application Serial No. 424,372, filed January 29, 1930, Patent No. 1,978,930, issued October 30, 1934. The German application corresponding to the latter has matured into Patent No. 535,537, October 12, 1931.

Machines are further known in which the selection of the totalizers for adding operations is made by means of keys, and for total taking operations, that is for settlement or daily balance, by setting levers. In this arrangement also only one revolution of the main gear shaft is required for total taking, but an increased space is required for the controlling mechanism, as besides the boards of special keys, the setting levers have to be lodged. A machine of this kind is described in the specification of patent application of Lehmann and Breitling, filed July 31st, 1928, Serial No. 296,445 to which corresponds French Patent No. 665,190, delivré April 30, 1929.

Finally, there are machines in which two operations of the driving mechanism are required for taking the total from one of the totalizers, owing to the idle run periods, whereby the manipulation of the machine becomes more complicated. More particularly with hand-operated machines of this kind the retardation of the manipulation is very great when the totals have to be taken successively from a large number of totalizers. A machine of this class is described in the specification of German Letters Patent No. 324,845.

In the machines of the two first-named types, the time of the actuation of the amount differential mechanism, and of the preparation of the coupling of the totalizers, are the same for all kinds of operations, and it is only the actuation or non-actuation of the totalizer coupling or engaging mechanism which is controlled in different ways for the different kinds of operations. As in the machines of the last-named construction, idle run periods occur which result in an unfavorable working diagram.

Now the object of the present invention is an arrangement in which no idle run periods occur so that the entire working time is fully utilized in all kinds of operations of the machine. In this way an extremely favorable distribution of the controlling and working operations is obtained for all kinds of operations, so that, not only in an adding operation sufficient time is at disposal for the execution of all working operations in a positive way (for instance for the application of a step drum tens transfer mechanism), but that also only a single revolution of the gearing of the machine drive is required for total taking operations.

Figure 24:
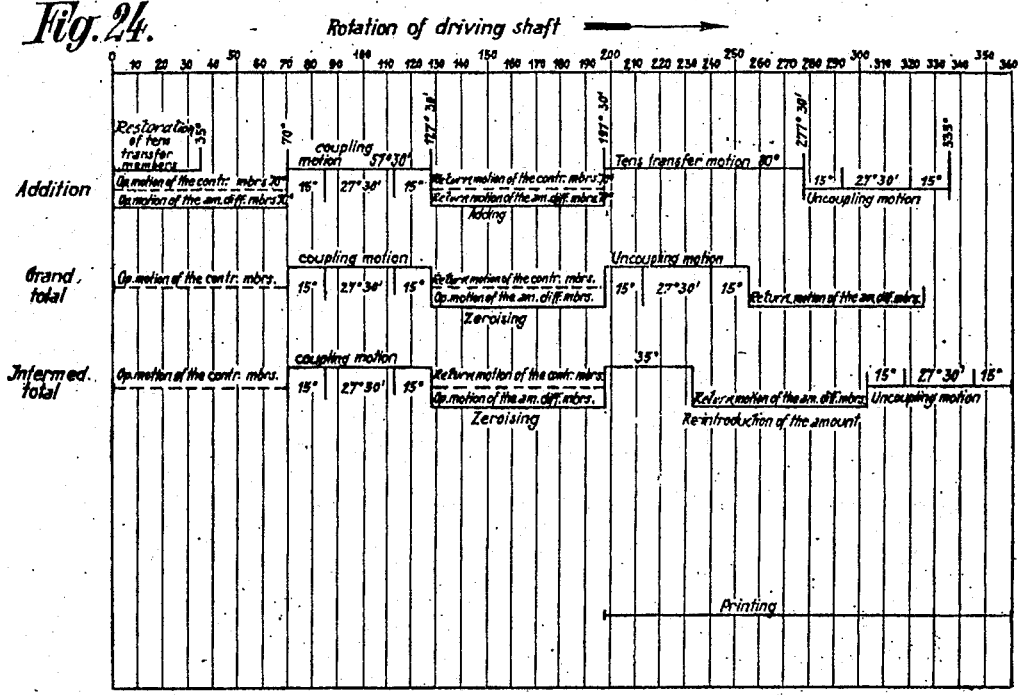
Figure 25:
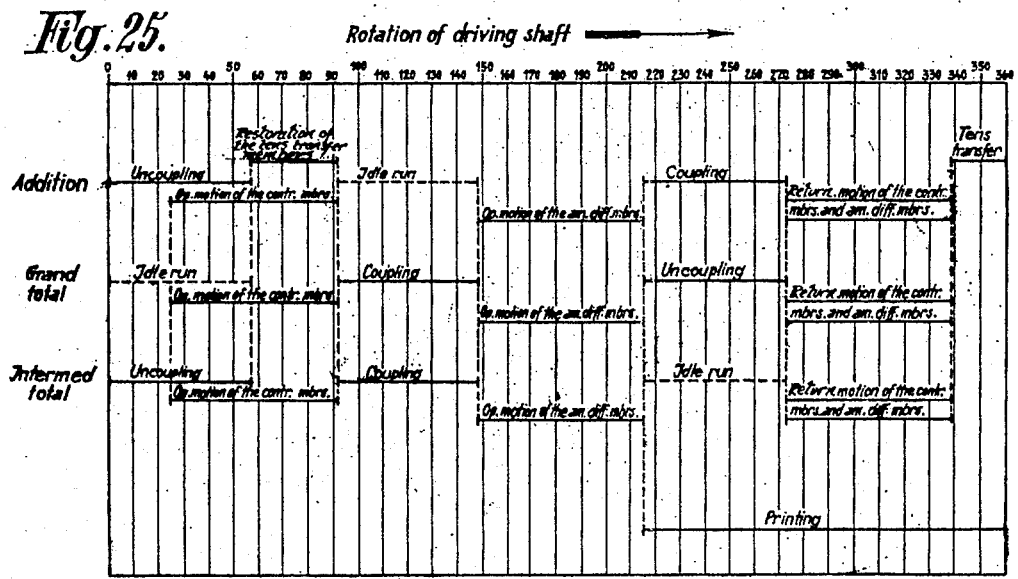

The advantage obtained by this regulatable control is to be seen best by comparison of the two working diagrams illustrated in Figures 24 and 25 of the accompanying drawings.

Both these diagrams relate to machines having several rows of (stationary) totalizers which are selected by special keys and coupled by shifting rider axles. Only one machine operation is required in both these machines for an adding operation as well as for a total taking operation.

With other conditions the same, the time of actuation of the amount differential mechanism, and of the preparatory movement for the coupling of the totalizers, are always the same for all kinds of operation of the machine portrayed in Figure 25, while in the other machine according to the invention, Figure 24, the actuation of the amount differential mechanism and the coupling and uncoupling motion of the totalizers is regulatable and takes place at different times according to the kind of operation of the machine.

Figure 3:
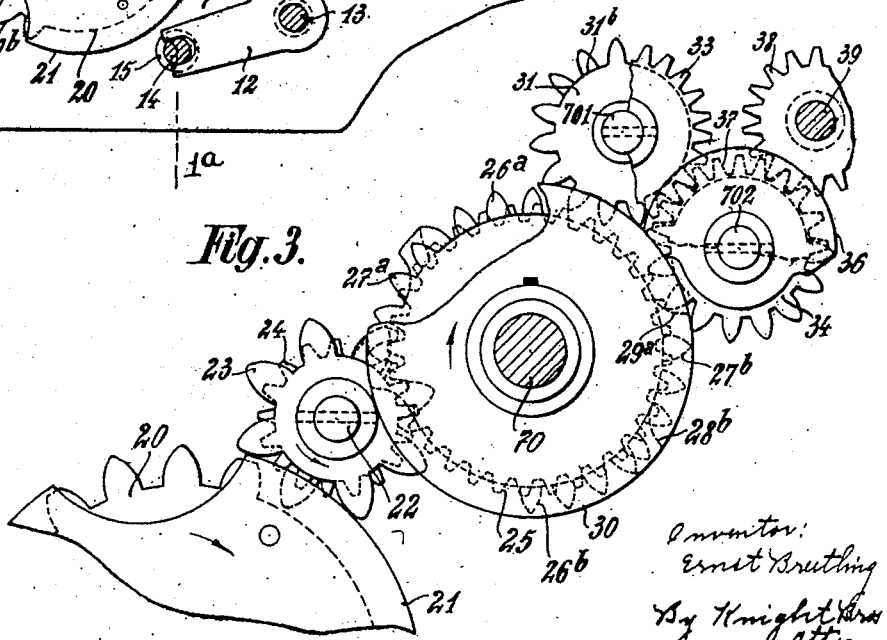
Figure 4:
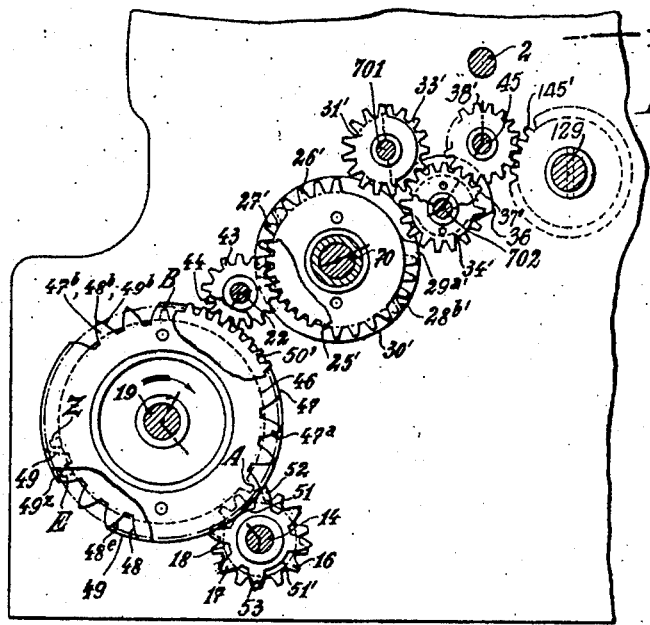
Figure 5:
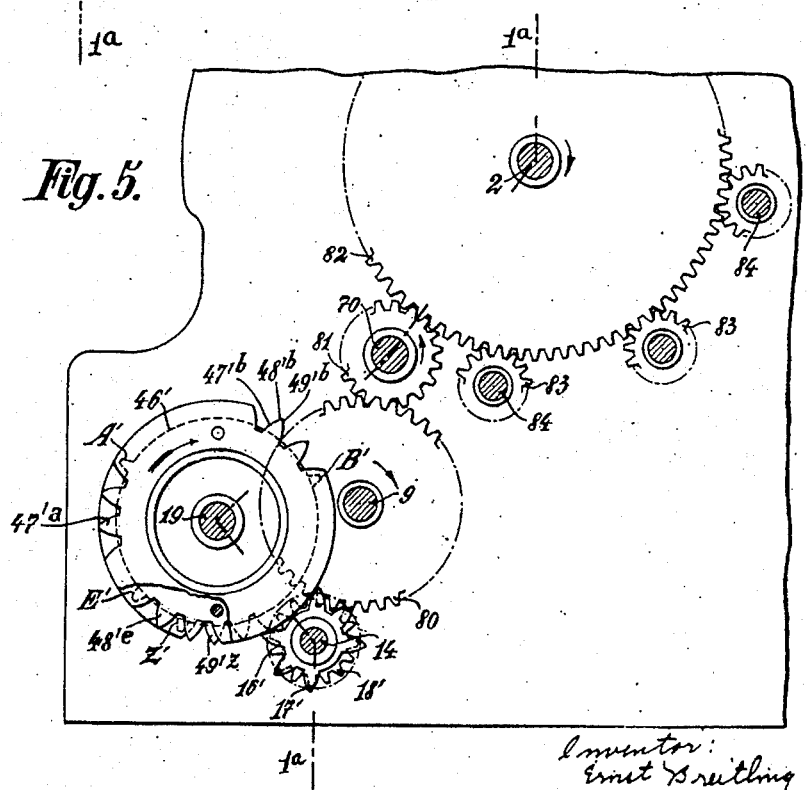
Figure 6:
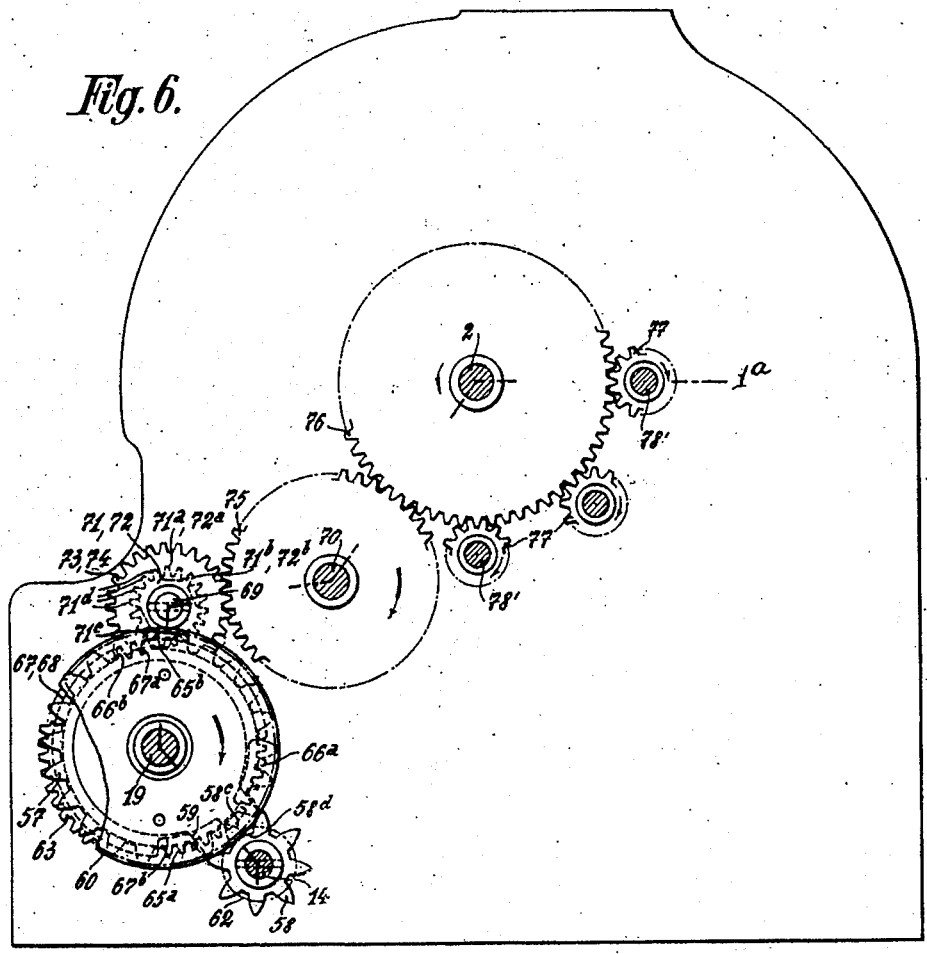
Figure 7:
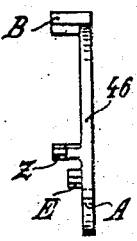
Figure 8:
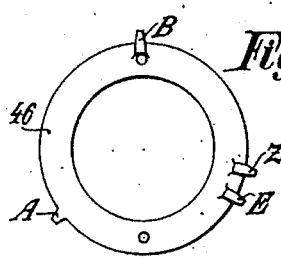
Figure 22:
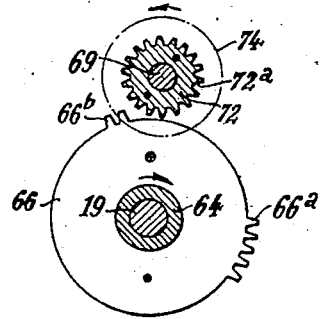
Figure 23:
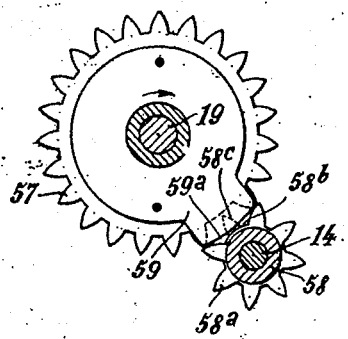

In order that the invention may be more readily understood, an embodiment of the same is illustrated by way of example in the accompanying drawings in which Fig. 1 is a perspective view of the machine according to the invention, showing the setting area thereof, Figure 1a is a longitudinal section of the controlling mechanism on the lines 1a—1a of Figures 2, 4, 5 and 6, Figure 2 is a cross section of the members controlling the selection of the totalizers, with the kind-of-operation lever, Figure 3 shows some members of Figure 2 on an enlarged scale, Figure 4 is a cross section of the members controlling the amount differential mechanism, Figure 5 is a cross section of the members controlling the coupling motion of the rider axles, Figure 6 is a cross section of the members controlling the tens transfer, Figures 7 and 8 are front and side views respectively of a detail member for controlling the amount differential mechanism, Figures 9–14 are progressive side views of the mechanism controlling the selection of totalizers, Figures 15–18 are progressive side views of a portion of the mechanism controlling the amount differential mechanism, Figures 19–22 are progressive side views of the members controlling the tens-transfer mechanism, Figure 23 is a side view of a detail of the mechanism controlling the tens-transfer mechanism, and Figure 24 is a working diagram of the machine fitted with the regulatable controlling mechanism according to the invention, and Figure 25 is a working diagram of a machine having no regulatable controlling mechanism exemplifying a machine of the prior art.

Figure 26:
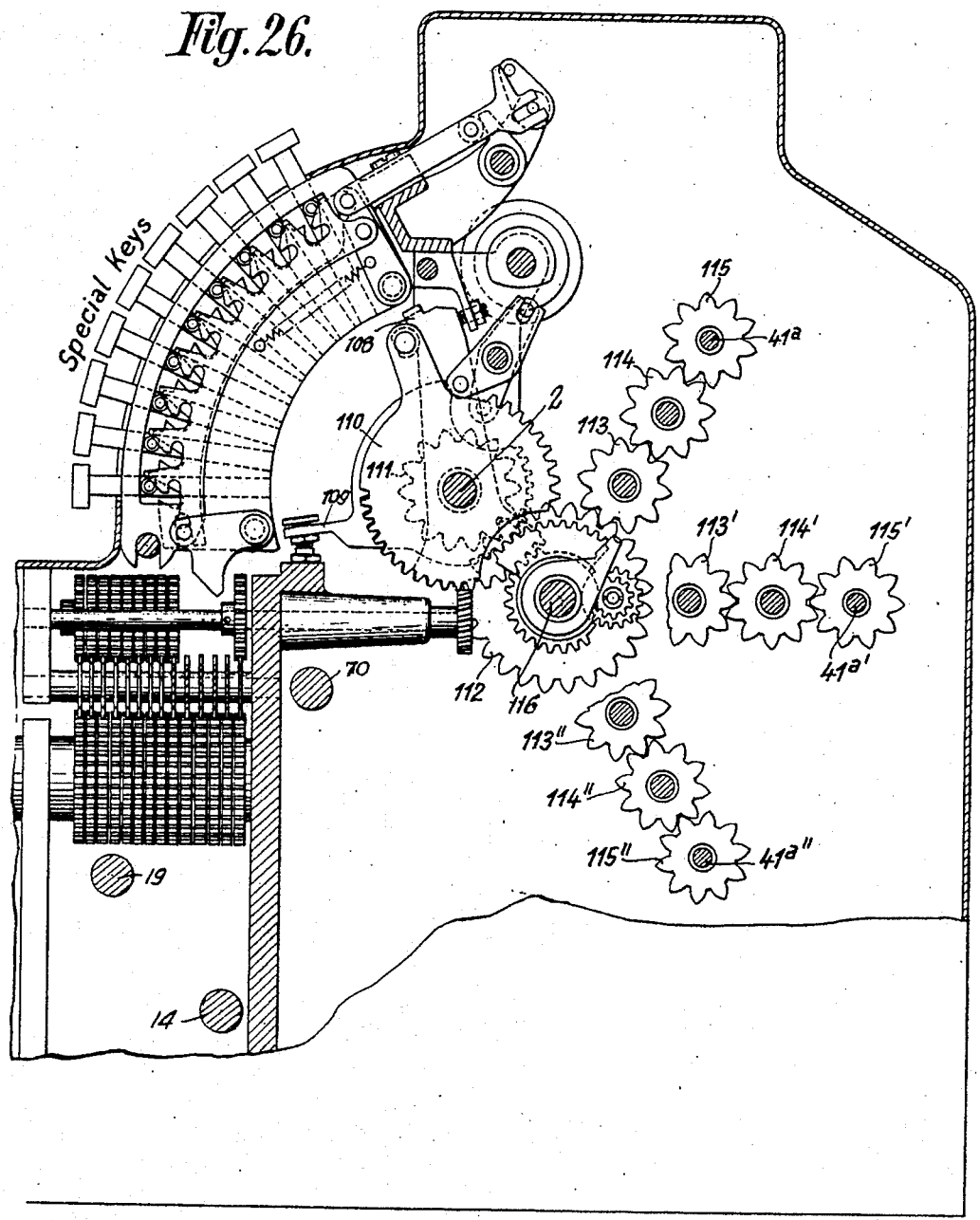
Figure 27:
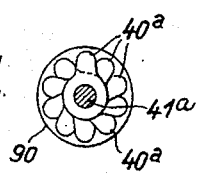
Figure 28:
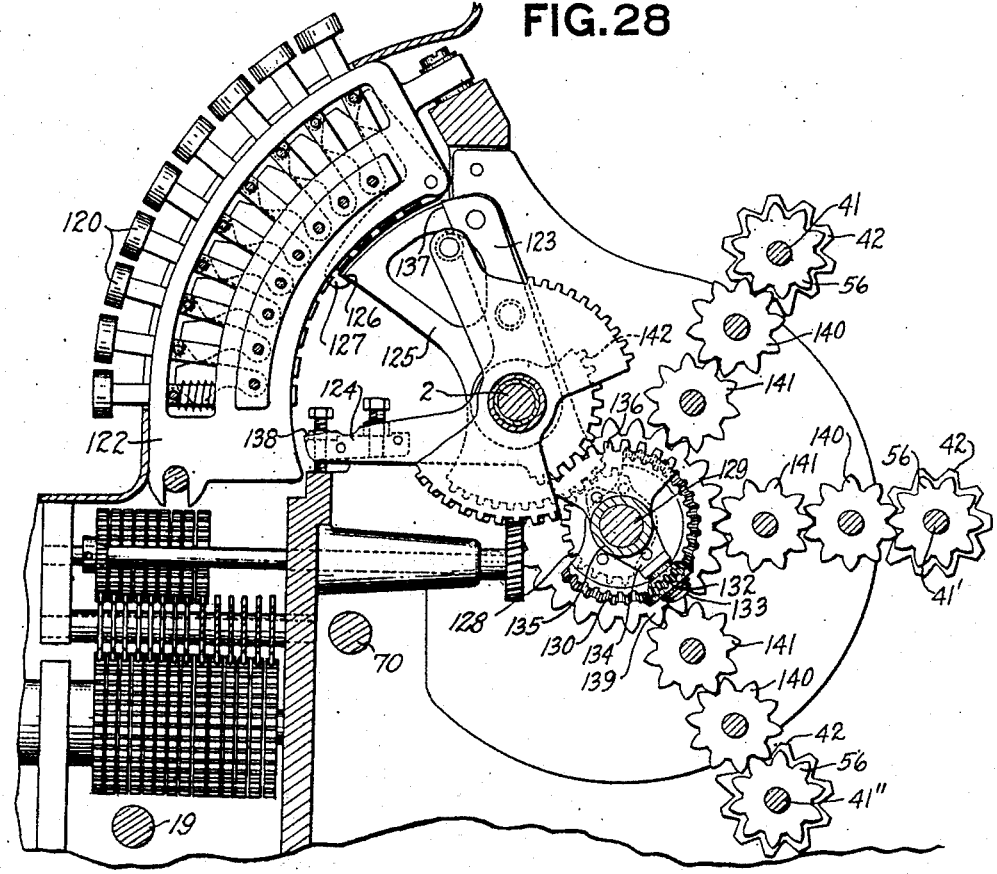
Figure 29:
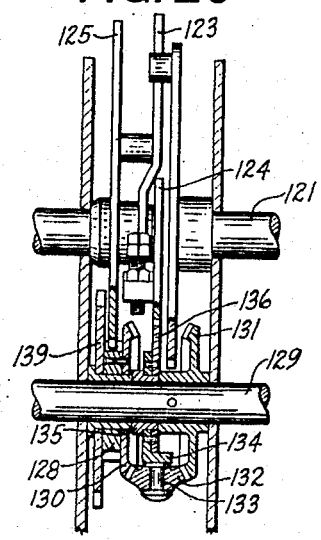

Fig. 26 is a side elevation of the machine taken along a bank of the special keys, and Fig. 27 is a side elevation of step-drum 40 in Fig. 1a, Fig. 28 is a side elevation of the amount differential and the amount key bank, Fig. 29 is a sectional view of the amount differential.

The machine hereinafter described is a cash register with mechanisms for printing totals and single amounts. It is provided with several rows of amount keys, three rows of special keys, the individual keys of which influence each one of the stationary totalizers, a lever for the selection of the three different kinds of operations, viz. addition, taking grand totals, and intermediate totals, and a motor key serving to start the operation. The control of the selection of the totalizers, Figure 24 always takes place at the same time and is separate from the control of the amount differential mechanism which takes place at different times. The coupling and uncoupling of the totalizers likewise depends upon the kind of operation of the machine and accordingly takes place at different times.

The selection of the kind of operation is made in the embodiment illustrated and described by means of a lever. It may, however, be caused by a selection member which is influenced by keys and positioned by the machine, without deviating from the scope of the invention.

For an adding operation the kind-of-operation lever 1, Figures 1a and 2, is set to uppermost position. Lever 1 is loose on shaft 2 and is yieldingly held locked in each of the three set positions by a spring-actuated pawl 3 engaging one of the three notches 5 of a locking segment 4.

Segment 4 has hinged to it a link 6, the lower end of which is hingedly connected to an arm 7 of a cam groove drum 8 which upon lever 1 being set is so turned on its shaft 9 that its cam groove 10, which is engaged by a roller 11 of a forked lever 12 loose on a shaft 13, shifts the latter on this shaft into its right-hand limit position, Figure 1a.

Lever 12 embraces by its forked end a shaft 14, Figure 1a, between two collars 15, 15 fast on the latter, so that lever 12, when shifted, entrains shaft 14.

A group of interconnected gears is mounted loosely but non-shiftably on shaft 14, which group consists of a pinion 16, a setting pinion 17, and a broad pinion 18, see Figures 1a and 4.

After depression of the amount keys the operation is started by depressing the motor key.

A driving shaft 19, Figure 4, makes one revolution in clockwise direction in each machine operation of the machine. This driving shaft imparts differently timed movements to the controlling members for totalizer selection, the amount differential members, and the totalizer coupling members. The drive of the controlling members for totalizer selection will be described first, the operative or forward movement of which takes place during the first 70° of the machine operation.

On shaft 19 is fastened an actuating gear 20, Figures 1a, 2, and 3, which has rigid to it a locking disc 21 and co-operates with an actuating pinion 23 loose on a stub shaft 22 in such a manner that an interrupted rotation is imparted to pinion 23 and to a gear 24 connected thereto in counterclockwise direction which rotation is converted into a rocking motion by means of a gearing of the type described in my co-pending patent application Ser. No. 376,745, filed July 8, 1929, Patent No. 1,846,785, February 23, 1932, this gearing comprising the gear wheel 25, the actuating wheels 26, 27, locking discs 28, 29 and 30, actuating pinions 31 and 34, locking disc 36, and the gear wheels 33, 37.

To facilitate the understanding of the arrangement, the function of this converting gear will be explained briefly in connection with the Figures 1a to 3 and 9 to 14.

Two opposite teeth of the actuating pinion 23 are cut away on half their width so that the locking disc 21 can engage the gaps thus formed and lock pinion 23 in the initial position and after the first partial rotary motion. These cut-away teeth serve at the same time as tripping teeth for the engagement of the two crowns of teeth 20a and 20b of the actuating gear 20. The stepwise driving motion effected by these teeth is transmitted by the gear wheel 24 rigid with pinion 23 as clockwise rotary motion to gear wheel 25, loose on shaft 70, and rigidly connected to the actuating wheels 26, 27 and locking discs 28, 29, 30. The actuating pinion 31 is loose on a stub shaft 701, two teeth 31a thereof being cut away on half their width, so that there is a continuous crown of teeth 32a and a mutilated crown 32b having a double-toothed gap 31b. These teeth are the second and third from the top of Fig. 13. The actuating pinion 26 lies in the plane of the continuous teeth 32a, while the locking disc 28 is in the plane of the mutilated crown of teeth 32b. In a similar manner the actuating pinion 34 which is loose on a stub shaft 702 possesses a continuous crown of teeth 35a in the plane of actuating wheel 27, and a mutilated crown of teeth 35b two teeth 34a of which are cut away on half their width so as to form a double-toothed gap 34b. The teeth 35b lie in the plane of locking disc 29. The actuating pinion 34 has rigidly connected to it the locking disc 36 the locking surface 36a of which in the initial position abuts on the circumferential face of locking disc 30 and thereby secures pinion 34 against counterclockwise rotation (Fig. 9). The latter has further rigid to it the gear wheel 37 which is permanently in mesh with wheel 33 rigid with pinion 21. The locking face 29a comes to abut on one of the teeth of the series of teeth 35b (Fig. 11) adjacent the gap 34b and locks pinion 34 against clockwise rotation.

Upon the first partial rotary motion transmitted by gear wheel 24, the locking nose 29a is rocked out of the path of the first tooth of pinion 34 whereupon the teeth 26a come into mesh with pinion 31 and impart to it a rotation of 180 degrees, at the end of which the locking surface 36b of disc 36 abuts on the circumferential face of locking disc 30, while a locking nose 28a arrives in the gap 31b so that the two pinions 31 and 34 are again locked in both directions of rotation. The above rotation of pinion 31 in a counterclockwise direction is transmitted by the gear wheels 33, 37, 38 to shaft 39 as a counterclockwise rotation, Figure 3.

Upon the second partial rotary motion initiated by teeth 20b and transmitted by wheel 24, a series of teeth 27a comes into mesh with pinion 34 and turns it back until the locking surface 36a again abuts on the circumferential face of locking disc 30 and nose 29b enters gap 34b. This second partial rotation is transmitted to shaft 39 as a clockwise rotation. This motion effects the return motion of the controlling members for totalizer selection, explained hereinafter, extending between 127° 30' and 197° 30' in the working diagram shown in Fig. 24. The actuating wheels and locking discs 25—30 have thus made a rotation of 180 degrees during an operation of the machine and at the end of an operation the teeth and noses denoted with the index b are in the position the members with the index a assume at the commencement of the machine operation.

From shaft 39 the rocking motion is transmitted farther, to actuate the controlling members.

During the first rocking movement of shaft 39, the controlling members 108, 109 for selecting the totalizers are rocked toward each other until they are arrested by striking the sides of the stem of the depressed special key, Fig. 26. The operation of a tong-like differential mechanism, which serves to set a setting member 110 in accordance with a depressed key, is well known in the art and is illustrated in my Patent No. 1,792,569, February 17, 1931. The actuation of the differential mechanism is executed by shaft 116 which is in driving engagement with shaft 39 (Fig. 2). The connection between shafts 39 and 116 is by pinion 38 meshing with a pinion 145 secured to shaft 116. A wheel 111 is fastened to setting member 110 and drives a shaft 41a through wheels 112, 113, 114 and 115. By means of a coupling 150 (Fig. 1a) a shaft 41 is connected to shaft 41a so as to be axially shiftable but not rotatable with respect to each other. The rotation of shaft 41a causes a setting of step-drum 40 with that one of its steps 40a in the path of lug or movable stop 88 and fixed stop 89 which corresponds to the depressed totalizer selector key. As may be seen in Fig. 27, these steps 40a are arranged spirally on the step-drum. The desired totalizer is selected by the setting of the drum 40. As explained hereinafter, the totalizer is coupled for operation by the rotation of drum 54 which drives movable stop 88 (Fig. 1a) to the left and entrains the step 40a in its path. The resulting shifting movement of shaft 41 carries the riders 55 into engagement with the counting wheels of the several orders of the desired totalizer and in driving connection with the amount differential members through the differentially actuated wheels 56. At the return movement of drum 54, the stop 88 engages the return flange 90 of step-drum 40 and returns shaft 41 to its right end position which serves to uncouple the counting wheels of the totalizers from the differential actuators. In a like manner, the totalizers associated with the other special key banks are selected and coupled. The disposition of the other rows of totalizers is indicated in Fig. 26 wherein the elements associated therewith corresponding to those described above are designated by 113', 113'', 114', 114'', 115', 115'', 41a' and 41a'', which are disposed in alignment with the respective differential members of the key banks.

The stub shaft 22, Figure 1a, which is mounted in a partition of the machine frame, has mounted on it besides the double pinion 23, 24, further a double gear wheel 43, 44, Figures 1a and 4, to which are likewise imparted, in a manner to be described hereinafter, two separate partial rotary motions of 180 degrees each which by means of a similar converting gear are converted into a rocking motion delivered by the shaft 45 for the actuation of the amount differential members.

Now, while the actuation of the controlling members for the selection of the desired totalizer takes place always at the same instant, the actuation of the amount differential members takes place according to the invention at different instants in order to avoid idle runs in the different operations of the machine.

The setting of the machine to the different kinds of operation, viz. addition, taking intermediate totals and grand totals, is established by the kind-of-operation lever 1 by which shaft 14 with the set of pinions 16, 17, 18 is shifted into one of the three positions, as described above.

The driving shaft 19, Figures 1a and 4, has rigidly fastened to its a set of actuating wheels consisting of a tripping wheel 46 and three actuating wheels 47, 48, 49.

The tripping wheel 46 has four teeth A, B, Z and E, Figures 4, 7, 8, out of which the teeth A, Z, E are arranged in three different planes while tooth B extends on all these three planes. Each of the three actuating wheels 47, 48, 49 has two groups of teeth and two locking faces, Figures 15–18, the one group 47b, 48b, 49b of the three wheels being located on the same place while the groups of teeth 47a, 48e, 49z are staggered with respect to one another.

When shaft 14 has been shifted into its extreme right-hand end position, Figure 1a, by setting the kind-of-operation lever 1 to adding position, pinion 16 is opposite wheel 46 in such a manner that the teeth A and B of the latter can co-operate with pinion 16. The actuating pinion 17 is opposite wheel 47 while the broad pinion 18 is in mesh with an intermediate wheel 50 loose on shaft 19.

At the beginning of the revolution of shaft 19 tooth A of wheel 46 comes into mesh with pinion 16, Figure 18, and turns pinion 17— which till then has been held in locked position by its gap 51, Figure 15, being engaged by the locking face of wheel 47—so far that its first tooth 52 engages the teeth 47a by which the rotation of shaft 19 is now transmitted to pinion 17 which makes a rotation of 180 degrees, whereupon pinion 17 is again locked by the other locking face of wheel 47 engaging another gap 51' of pinion 17.

The broad pinion 18 rigid with pinion 17 transmits this rotation through the intermediate wheel 50 to wheel 44 which as mentioned above is rigid with wheel 43 and is loose on stubshaft 22. Wheel 43 is in mesh with a wheel 25'. The gear ratio existing between these two wheels is so chosen that wheel 43 makes half a revolution (180 degrees) which is transmitted as a quarter of a revolution to wheel 25'.

Wheel 25' is the first wheel of a converting gear of the same design as that actuating the controlling members. The members 25' to 38' of this gear correspond to the members 25 to 38.

This converting gear converts the first partial rotary motion of driving shaft 19 and wheel 43 into a rocking motion which is received in a counterclockwise direction by shaft 45 and delivered for the positioning of the amount differential members. This forward positioning movement of the amount differential member is designated in Fig. 24 as taking place during the first 70° of the machine operation.

Upon further rotation of shaft 19 the tooth B of wheel 43 imparts to pinion 18 and to pinion 17 connected thereto a small rotary motion whereby a tooth 52 of pinion 17 engages the teeth 47b of wheel 47 so that another partial rotary motion of 180 degrees is imparted to pinion 17 by the teeth 47b, until it is locked again by the respective locking face entering gap 51.

This second partial rotary motion is converted by the converting gear into a backward rocking motion which is received in clockwise direction by shaft 45 and serves to return the amount differential members. This motion takes place between 127° 30' and 197° 30' of the machine cycle (Fig. 24).

In this adding position of the kind-of-operation lever 1 and pinion 17 the actuation of the amount differential members takes place at the same time as that of the controlling members, compare Figure 24, addition.

The totalizer which corresponds to the depressed special key is selected by the first motion of the controlling members 108 and 109 while at the same time, by the first motion of the amount differential members, the amount set by the depressed amount keys is transmitted to the positioning members of the amount differential mechanism.

Thereafter the coupling of the selected totalizer with the positioning members of the amount differential mechanism is effected.

The coupling itself is established in known manner by the rider axle 41, Figure 1a, being shifted, according to the positioning of step drum 60, by a cam groove drum 54 in such a manner that the riders 55 couple the adding wheels 42 of the respective totalizer with the appurtenant actuating wheels 56 which are permanently in mesh with the positioning members of the amount differential mechanism. The driving movement for effecting the coupling of the totalizer wheels with the differentially actuated members is explained hereinafter.

Upon the subsequent opening of the differential tongs and return of the positioning members of the amount setting mechanism the introduced amount is transmitted to the coupled adding wheels 42. The amount differential is fully disclosed in Letters Patent of the United States, No. 1,792,569, issued to me on Feb. 17, 1931. This amount differential shown herein in Figs. 28 and 29, will be briefly described. For a full description reference may be had to said patent.

The amount keys 120 are concentrically arranged around a shaft 121, and slidably mounted in a key frame 122. The differentially operable member 123, and its complementary movable member 124 are pivotally mounted on shaft 121. The differential member 123 is rigidly connected with a segment 125 having a nose 126 to cooperate with a zero stop pawl 127 to arrest the member 123 in zero position when no key is depressed. The segment 125 is provided with teeth meshing with a pinion 128 loose on a shaft 129. The pinion 128 is rigidly connected to a bevel wheel 130 that constitutes one of the sun wheels of the differential gears, the other sun wheel of which is a bevel wheel 131 (Fig. 29), rigid on shaft 129. The wheels 130 and 131 are in mesh with the planet wheel 132 loosely rotatable on a stud 133 of an arm 134. The arm 134 is rotatably mounted on shaft 129 by a hub 135, and is rigidly connected with a segment 136 in mesh with a series of teeth 142 of the complemental member 124. The members 123 and 124 have noses 137 and 138, respectively, cooperating with the stem of the depressed amount key 120.

During each operation the shaft 129 is rocked to and fro by shaft 45, by connections comprising pinion 39' (Fig. 4) meshing with a gear 145', secured to the shaft 129. This rocking movement is transmitted by bevel wheel 131 to planet wheel 132 and by the latter to arm 134 and bevel wheel 130. When this takes place, the differential members 123 and 124 are rocked toward each other until one is arrested by the depressed key.

As before mentioned, the totalizer elements 42 are mounted on shafts 41. The elements 42 are selected by the rider axle 55 which is actuated by gear 56. The gear 56 is connected to a gear 139, rigid with the bevel gear 130, by a train of gears 140 and 141. As the bevel gear 130 is in constant connection with the differential member 123, the amount entered into a totalizer element 42 is determined by the movement of member 123, which in turn is controlled by the depressed amount key.

This arrangement thus results in the fact that the differential introduction of the amount takes place immediately after the coupling of the totalizer and that this introduction is completed so early, that is after a rotation of the driving shaft of about 200 degrees, that sufficient time is at disposal, namely that corresponding to 80 degrees of rotation, for the tens transfer now following, so that the tens transfer mechanism can be designed as step drum transfer mechanism.

The tens transfer mechanism is actuated in the following manner:

The gap of a mutilated wheel 57 fast to driving shaft 19, Figures 1a, 6 and 23 is in position of rest opposite the full crown of teeth 58a, Figure 1a, of a pinion 58 shiftable with shaft 14 but rotatable thereon, Figure 23, while a locking disc 59 rigid to wheel 57 engages by its locking face 59a a gap 58b of pinion 58 so that the latter is locked in position of rest.

At the beginning of the rotation of the driving shaft 19 the locking face 59a of disc 59 releases pinion 58 so that the latter can execute the rotation transmitted to it by wheel 57.

The wheel 57 has further fixed to it a circular locking disc 60, Figures 1a and 6, which has opposite to it during the adding operation an annular groove 61 of pinion 58, so that disc 60 does not prevent the rotation of pinion 58.

To pinion 58 is rigidly connected a broad pinion 62 which transmits this rotation to a gear wheel 63 fixedly mounted on the hub 64 of an actuating wheel 66, and loosely rotatable together with this hub on shaft 19.

The actuating wheel 66 has rigidly connected to it two locking discs 67 and 68 and an actuating wheel 65. The wheels 65 and 66 have each a group of five teeth 65a and 66a, respectively, and a group of two teeth 65b and 66b, respectively, which co-operate with two pinions 71 and 72, Figures 1a, 6, 19, 22, mounted on a stub shaft 69.

Each of the pinions 71, 72 possesses two differently designed groups of teeth 71a, 71b and 72a, 72b, the full crown of teeth 71a and 72a being opposite the wheels 65 and 66, respectively, while the groups 71b and 72b show four double-toothed gaps and are opposite the locking discs 67 and 68, respectively, Figures 19 to 22.

The function of wheel 65 with the appurtenant locking disc 67 and pinion 71 will be described first.

In the position of rest pinion 71 is unable to rotate as the locking face of disc 67 engages a gap of pinion 71.

By the rotation of the driving shaft 19 one revolution in clockwise direction, rotation is imparted also to wheel 65 with disc 67, through the gears 57, 58, 62, 63.

Shortly after the beginning of this rotation the two teeth 65b engage the full crown of teeth 71a of pinion 71 to which thus a partial rotation of 60 degrees is imparted. This movement actuates the drive for the restoration of the displaced tens transfer members.

Figure 20:
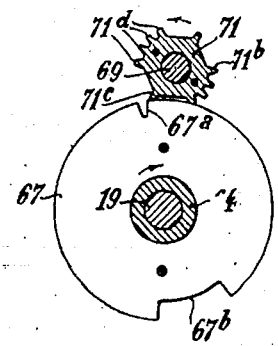
Figure 21:
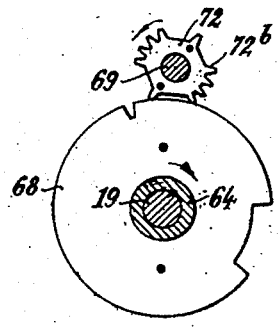

During this rotation tooth 71c, Figure 20, of the group 71b can pass through a recess 67a of disc 67 so as to admit the rotation of pinion 71. Thereupon pinion 71 is again locked by disc 67 co-operating with a gap of the former.

Upon further rotation of wheel 65 the teeth 65a engage the teeth 71a whereby pinion 71 is further rotated 120 degrees. During this rotation the teeth 71d, Figure 20, of pinion 71 can pass through a corresponding recess 67b of disc 67 so as not to prevent this rotation. Also, during this movement, the drive for the operation of the tens transfer members is actuated.

Thereupon pinion 71 is locked anew by disc 67. A wheel 73, Figures 1a and 6, fixed beside pinion 71 transmits this partial rotation through an intermediate wheel 75 mounted on shaft 70 to a wheel 76.

Wheel 76 is in mesh with pinions 77, Figures 1a and 6, to which by this mesh a stepwise rotation is imparted, viz. a first rotation of 120 degrees at the beginning of the machine operation, and then a rotation of 240 degrees after the amount has been entered into the totalizer wheel.

Each of the pinions 77 is fixed on the hub 77a of a pinion 77b which transmits the actuating motion through a gearing 101, 103 on counter-shaft 102 through a gear 104 on shaft 78 (Fig. 1a), to the stepped discs of the step tens transfer mechanism of each row of totalizers, which discs are arranged in a helical line on a shaft 78. Such an arrangement of a tens-transfer mechanism is shown in my co-pending application, Serial No. 424,372, filed January 29, 1930, Patent No. 1,978,930, issued October 30, 1934.

During the first partial rotation of the shaft 78, which takes place at the beginning of the machine operation, during the first 35° of the machine operation (Fig. 24), the members that have been displaced in a preceding tens-transfer operation are restored to initial position and locked therein until the amount has been introduced into the adding wheels. Thereupon the second partial rotation of the shaft 78 takes place, during which the stepped discs effect the tens transfer of those adding wheels of which the neighboring adding wheels of lower order had experienced a passage from 9 to 0.

In the embodiment illustrated the step tens transfer mechanism possesses a two-part actuating shaft 78, 78'. Therefore a double drive has to be provided for this shaft. Such a drive in conjunction with a stepped drum transfer mechanism is disclosed in my co-pending applications Serial No. 424,372, filed January 29, 1930, Patent No. 1,978,930, issued October 30, 1934 and Serial No. 522,053, filed March 12, 1931.

This other drive is derived from the actuating wheel 66 already mentioned which is rigid with wheel 65. The rotation of wheel 66 and its transmission to wheel 76 takes place in the same manner as with wheel 65, with the only difference that the motion is transmitted to a pinion 77' fast on the actuating shaft 78'. The shaft 78' carries the step discs of higher order.

The tens transfer motion of the adding wheels of higher order must of course take place only after the transfer motion of the adding wheels of lower order has been completed which is caused by the first part 78 of the two-part actuating shaft.

Figure 19:
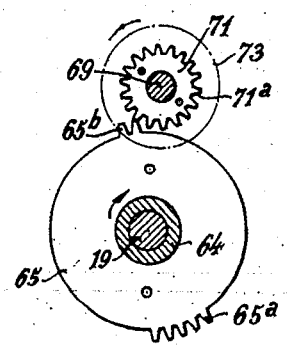

To this end the groups of teeth 66a and 66b of the disc 66, Figure 22, are displaced relatively to the group 65a and 65b of disc 65, Figure 19, in such a manner, that the second part 78' of the actuating shaft is actuated only after the revolution of the first part has been completed.

After the completion of the tens transfer operation, the uncoupling of the selected totalizer by the rider axle 41 being shifted back takes place, so that at the end of the machine operation the machine is in state of rest. This movement is represented as extending between 277° 30' and 335° in the working diagram of Fig. 24, and is described below.

When a grand total is to be taken, the kind-of-operation lever 1 is set to medium position, whereby the pinion 17 is shifted so as to be opposite actuating wheel 48.

Upon shaft 14 being shifted, pinion 16 comes into the plane of the teeth B and E of wheel 46 while the broad pinion 18 remains in mesh with the intermediate wheel 50, Figures 1a and 4.

Now with a revolution of driving shaft 19 the same forward and backward rocking motion for the actuation of the amount differential members takes place by means of wheel 46, pinion 16, Figure 18, wheel 48, pinion 17, Figure 16, broad pinion 18, intermediate wheel 50, and the converting gear, as in the described adding operation, but at other times.

The group of teeth 48b of wheel 48 corresponds to the group 47b of wheel 47, Figures 15, 16, so that the first partial rotation of pinion 17 and the first motion of the amount differential members takes place only after the totalizer selected in the meantime has been coupled with the positioning members of the amount differential mechanism, compare Figure 24, zeroizing.

Now, by the first motion of the amount differential members the amount contained in the selected totalizer is taken up by the positioning members until the totalizer is again at zero.

The amount thus taken up by the positioning members is at the same time transmitted to the type wheels.

This taking-up of the amount from the totalizer and its transmission to the type wheels is completed at about 200 degrees of revolution of the machine drive, so that sufficient time is at disposal for the actuation of the printing mechanism for the remainder of the machine operation, as may be seen in Fig. 24.

In taking a grand total the totalizer is uncoupled immediately after it has been zeroized, whereupon the other group of teeth, 48e, of wheel 48, Figure 16, imparts another partial rotation to pinion 17 by which rotation the amount differential members are restored.

In taking an intermediate total, the kind-of-operation lever 1 is set to lowermost position, the pinion 17 arriving opposite wheel 49, Figure 17. Now pinion 16 is opposite the teeth B and Z of wheel 46 which upon shaft 19 revolving, bring the respective teeth of pinion 17 at the respective times into mesh with the groups of teeth 49b and 49z of wheel 49, Figure 17.

The teeth 49b of wheel 49 are situated in the same relative position as the teeth 48b of wheel 48, Figures 15 and 16. Therefore the actuation of the amount differential members, to reset the selected totalizer, takes place in the same way and at the same time as in the grand total taking operation.

Upon further rotation of the shaft 19, the group of teeth 49z of wheel 49 become meshed with the pinion 17. The teeth 49z are so located on the wheel 49 that the return movement of the amount differential members is effected prior to the uncoupling of the totalizer wheels from the amount differential members. This causes the amount taken from the totalizer to be again entered into the totalizer wheels. After the amount is re-entered into the totalizer the totalizer is uncoupled and the machine comes to rest in its initial, or home position. The means for shifting the rider axle 41 to couple and uncouple the totalizer, includes the drum cam 54, (Fig. 1a). The mechanism for actuating the drum cam is hereinafter described.

In total taking operations no tens transfer must take place, as in total taking operations, during the time provided in adding operations for the tens transfer, the restoration of the amount differential members and the uncoupling of the totalizers is effected and the adding wheels are not to be influenced by the tens transfer mechanism and the step discs.

The crippling of the tens transfer mechanism during a total taking operation takes place automatically by setting the kind-of-operation lever 1 to one of the two total taking positions.

If lever 1 is set to grand total taking, shaft 14 is shifted in a manner already described into medium position. On shaft 14 is rotatably but non-shiftably mounted the above-mentioned interconnected group of actuating wheels composed of a pinion 58 and a broad pinion 62.

Pinion 58 is constructed in the following manner:

Its left-hand portion has a crown of teeth 58a one tooth of which, denoted by 58c, has only half the normal width, whereby a gap 58b is formed, Figure 23. Beside this crown there is an annular groove 61 without any teeth, and the outermost right-hand portion is formed again by a crown of teeth which is interrupted by a gap 58d, Figures 1a and 6.

Upon shaft 14 being shifted from position of addition to the grand total taking position, pinion 58 comes with its half-broad tooth 58c out of mesh with wheel 57 rigid to shaft 19.

Upon revolution of shaft 19, the teeth of wheel 57 can freely pass through the gap 58b and the free space formed by the annular groove 61 without rotating pinion 58, which in this case is secured against being turned by disc 60 engaging gap 58d, so that the tens transfer mechanism is not actuated.

Upon taking an intermediate total shaft 14 is shifted in such a manner by correspondingly setting lever 1, that the teeth of wheel 57 are opposite the annular groove 61 of pinion 58 and the locking discs 59 and 60 engage the gap 58d of pinion 58 whereby the latter and thus the actuation of the tens transfer mechanism is barred.

In order to fully utilize the advantage offered by the regulatability of the amount differential mechanism, also the instants of uncoupling of the totalizers must be regulatable.

Owing to the regulatability of the amount differential mechanism its motions take place in the different machine operations at different times. Also the uncoupling of the totalizers, in order that the different kinds of operation may be performed with only a single operation of the machine must immediately follow the preceding sub-operations. That is, in an adding operation the uncoupling must take place after the tens transfer; in grand total taking operations, after the zeroizing motion; and in taking intermediate totals after the re-introduction of the total, these three operations taking place at different times.

For the purpose of coupling the totalizers there is provided an actuating gear designed for interrupted rotary motion which comprises exactly the same members as that provided for the regulation of the amount differential mechanism, viz. a set of actuating wheels mounted on shaft 14 and consisting of a pinion 16', a pinion 17' and a broad pinion 18', and on the driving shaft 19 a set of actuating wheels comprising a tripping wheel 46' and actuating wheels 47', 48', 49', (Figures 1a, 5 and 24).

The set 16', 17', 18' is shifted upon lever 1 being set together with shaft 14, in such a manner that in adding operations pinion 17' is opposite wheel 47', in taking grand totals opposite wheel 48', and in taking intermediate totals opposite wheel 49'.

As the first groups of teeth 47'b, 48'b, 49'b are situated on the same places (Fig. 5), the first partial rotation of pinion 17' takes place in all operations at the same instant and is transmitted by pinion 18' and the gear 80, 81, 82, 83 to shaft 84 on which is fastened the cam groove drum 54.

The gear ratio is chosen in such a manner that drum 54 by said first partial rotation of pinion 17' makes a partial rotation of 180 degrees during which drum 54 shifts the shiftable step 88, Figure 1a, to the left by a distance which is the same in all operations. During this shifting motion stop 88 strikes the positioned step 40a of step drum 40 and entrains it with the rider axle 41 connected thereto through the shaft 41a and the coupling 150 so far until the positioned step 40a of drum 40 strikes a fixed stop 89. By this shift of the rider axle 41 the adding wheels of the selected totalizer are coupled by means of the rider 55, Figure 1a, with the actuating wheels 56 and the positioning members of the amount differential mechanism.

In order to cause the uncoupling of the totalizers to take place at different times in the different kinds of operation, the other groups of teeth of the wheels 47', 48', 49' are staggered relatively to one another. These other groups of teeth impart upon further rotation of driving shaft 19 to pinion 17' a second partial rotation of 180 degrees which is transmitted to the cam groove drum 54 the cam groove of which is reversed in such a manner that stop 88 is shifted back to initial position.

Stop 88 while returning strikes the return flange 90 of the step drum 40 and entrains the latter together with the rider axle 41 to initial position, whereby also the riders 55 are removed to inoperative position and the adding wheels are thus uncoupled.

As already mentioned, the second groups of teeth, viz. 47'a, 48'e, 49'z are staggered relatively to one another. This results in the fact that the second partial rotation of pinion 17' and thus the rearward motion of the rider axle and the uncoupling of the adding wheels takes place in an adding operation after the tens transfer has been completed, in taking grand totals after zeroizing and in taking intermediate totals after the re-introduction of the total of the amounts.

Without deviating from the scope of the invention, the wheels 47, 48, 49, 47', 48', 49' and 57, 59, 60 can be arranged shiftably in lieu of the pinions 16, 17, 18, etc.

What I claim as my invention is:—

1. A controlling mechanism for cash registers and calculating machines adapted to record single amounts, intermediate totals and grand totals, comprising amount differential members, a plurality of amount keys for controlling said differential members, a totalizer associated with said differential members, a setting member for determining the kind of operation of the machine, driving means for the amount differential members, and means for setting said driving means in operation at different periods in the cycle of a machine operation in accordance with the setting of the setting member.

2. A controlling mechanism for cash registers and calculating machines adapted to record single amounts, intermediate totals and grand totals, comprising amount differential members, a plurality of amount keys for controlling said differential members, a plurality of totalizers associated with said differential members, a setting member for the selection of the kind of operation of the machine, a drive shaft executing a constant excursion in the different kinds of operation of the machine when amounts are entered and when totals are taken, totalizer selector differential members, totalizer coupling members, means actuated by said drive shaft to control the totalizer selector differential members at the same time in all kinds of operation of the machine, and other means actuated by said drive shaft for driving the amount differential members at different times and for actuating the totalizer coupling members at different times according to the setting of the setting member.

3. The combination claimed in claim 2, wherein said last mentioned means comprises a plurality of groups of intermittent drive gears driven by said drive shaft, a plurality of sets of pinions each of said sets cooperating with one of said groups of intermittent drive gears, said drive gears and pinions being shiftable with respect to each other.

4. The combination claimed in claim 2, wherein said last mentioned means comprises a plurality of groups of intermittent gears driven by said drive shaft, a plurality of sets of pinions each of said sets cooperating with one of said groups of gears, and means for relatively shifting said groups of gears and said sets of pinions under control of said setting member.

5. The combination claimed in claim 2, wherein said last mentioned means comprises a plurality of groups of gears fixedly mounted upon said drive shaft, a shiftable auxiliary shaft, a plurality of sets of pinions rotatably but non-shiftably disposed upon said auxiliary shaft, and means for longitudinally shifting said auxiliary shaft with said sets of pinions thereupon with respect to said gears controlled by said setting member.

6. A controlling mechanism for cash registers and calculating machines adapted to record single amounts, intermediate totals and grand totals, comprising a plurality of amount keys, a plurality of totalizers, a setting member for the selection of the kind of operation, a drive shaft, amount differential members, totalizer selector differential members, totalizer coupling members, a driving mechanism for the tens-transfer mechanism for the totalizers, means actuated by said drive shaft to control the totalizer selector differential members at the same time in all operations of the machine, other means actuated by said drive shaft to control the amount differential members and totalizer coupling members at different times during the different kinds of operation of the machine, and means actuated by said drive shaft for operating said driving mechanism for the tens-transfer mechanism at the recording of single amounts during adding operations.

7. The combination claimed in claim 6, wherein said two last-mentioned means are simultaneously positioned for operation by said setting member.

8. The combination claimed in claim 6, wherein said last-mentioned means comprises an actuating unit mounted upon said drive shaft, and a pinion assembly cooperating therewith shiftably arranged with respect to said actuating unit.

9. A controlling mechanism for cash registers and calculating machines adapted to record single amounts, intermediate totals and grand totals, comprising amount differential members, a plurality of amount keys for controlling said differential members, a plurality of totalizers associated with said differential members, a setting member for the selection of the kind of operation of the machine, a drive shaft, totalizer selector differential members, totalizer coupling members, a driving mechanism for the tens-transfer mechanism for the totalizers, means actuated by said drive shaft to control the totalizer selector differential members at the same time in all operations of the machine, other means actuated by said drive shaft to operate the amount differential members and totalizer coupling members at different times during the different kinds of operation of the machine, comprising a plurality of actuating gears upon said drive shaft, a longitudinally shiftable auxiliary shaft, means actuated by said drive shaft for operating said driving mechanism for the tens-transfer mechanism at the recording of single amounts during adding operations, comprising an actuating unit mounted upon said drive shaft, a pinion assembly cooperating therewith rotatably but non-shiftably disposed upon said auxiliary shaft, and means for longitudinally shifting said auxiliary shaft in accordance with the position of said setting member.

10. A controlling mechanism for cash registers and calculating machines adapted to record single amounts, intermediate totals and grand totals, comprising amount differential members, a plurality of amount keys for controlling said differential members, a plurality of totalizers associated with said differential members, a setting member for the selection of the kind of operation of the machine, a drive shaft, totalizer selector differential members, totalizer coupling members, a driving mechanism for the tens-transfer mechanism for the totalizers, means actuated by said drive shaft to control the totalizer selector differential members at the same time in all operations of the machine, other means actuated by said drive shaft to operate the amount differential members and totalizer coupling members at different times during the different kinds of operation of the machine, means actuated by said drive shaft for operating said driving mechanism for the tens-transfer mechanism at the recording of single amounts during adding operations, and means for blocking said last mentioned operating means for said driving mechanism for the tens-transfer mechanism during total taking operations and in the position of rest of the machine.

11. A controlling mechanism for cash registers and calculating machines adapted to record single amounts, intermediate totals and grand totals, comprising amount differential members, a plurality of amount keys for controlling said differential members, a plurality of totalizers associated with said differential members, a setting member for the selection of the kind of operation of the machine, a drive shaft, totalizer selector differential members, totalizer coupling members, a driving mechanism for the tens-transfer mechanism for the totalizers, means actuated by said drive shaft to control the totalizer selector differential members at the same time in all operations of the machine, other means actuated by said drive shaft to operate the amount differential members and totalizer coupling members at different times during the different kinds of operation of the machine, means actuated by said drive shaft for operating said driving mechanism for the tens-transfer mechanism at the recording of single amounts during adding operations only, comprising an actuating unit including intermittent gear, a segmental locking disc and a complete locking disc fixedly mounted upon said drive shaft, a pinion assembly cooperating therewith composed of an actuated pinion and a transmitting pinion connected to each other, said actuated pinion formed by a continuous crown of teeth at one end thereof with one half of one tooth cut away to coact with said segmental locking disc when said continuous crown of teeth is in alignment with said intermittent gear during adding operations, an annular groove in said actuated pinion opposite said complete locking disc, and a series of teeth beyond said groove with a one-toothed gap therein disposed towards said actuating unit, said pinion assembly being shiftable endwise with respect to said actuating unit in accordance with the kinds of operation of the machine, and a transmission gear permanently in engagement with said transmitting pinion.

12. A controlling mechanism for cash registers and calculating machines adapted to record single amounts, intermediate totals and grand totals, comprising amount differential members, a plurality of amount keys for controlling said differential members, a plurality of totalizers associated with said differential members, a setting member for the selection of the kind of operation of the machine, a drive shaft, totalizer selector differential members, totalizer coupling members, a driving mechanism for the tens-transfer mechanism for the totalizers comprising two shafts with coincident axes, means actuated by said drive shaft to control the totalizer selector differential members at the same time in all kinds of operation of the machine, other means actuated by said drive shaft to operate the amount differential members and totalizer coupling members at different times during the different kinds of operation of the machine, and means actuated by said drive shaft for operating successively the two shafts of said driving mechanism for the tens-transfer mechanism at the recording of single amounts during adding operations.

13. The combination claimed in claim 12, wherein said last-mentioned means comprises an actuating unit fixedly mounted upon said drive shaft, a pinion assembly cooperating therewith longitudinally shiftably arranged with respect to said actuating unit, a transmission gear loosely mounted upon said drive shaft in permanent engagement with said pinion assembly, two sets of actuating and locking discs rigidly connected to said transmission gear, and two pinion units cooperating with said actuating and locking discs, the teeth upon the pinions and actuating discs being so designed that successive movements are imparted to said pinions and the said two shafts.

14. A controlling mechanism for cash registers and calculating machines adapted to record single amounts, intermediate totals and grand totals, comprising amount differential members, a plurality of amount keys for controlling said differential members, a plurality of totalizers associated with said differential members, a setting member for the selection of the kind of operation of the machine, a drive shaft executing a constant excursion in the different kinds of operation of the machine when amounts are entered and when totals are taken, and means actuated by said drive shaft for driving the amount differential members at different times in the different kinds of operation of the machine.

15. The combination claimed in claim 2, wherein said last mentioned means comprises a plurality of groups of intermittent gears with actuating teeth thereon, said gears being driven by said drive shaft, a plurality of sets of pinions shiftably arranged with respect to said intermittent gears, one of said pinions in each set adapted to cooperate with different teeth on its cooperating intermittent gear, a second one of said pinions in each set adapted to cooperate with teeth on other gears of its respective group, and a transmission gear permanently engaging a third one of said pinions in its respective set.

16. The combination claimed in claim 2, wherein said last mentioned means comprises a plurality of groups of intermittent gears with actuating teeth thereon, said gears being driven by said drive shaft, a plurality of sets of pinions shiftably arranged with respect to said gears, one of said pinions in each set constituting a means for initiating the actuating movement of its respective set of pinions, adapted to cooperate with different teeth on its cooperating gear in the different operations of the machine, a second one of said pinions in each set constituting an actuating pinion adapted to selectively cooperate with different gears of its respective group, and a transmission gear permanently in engagement with a third one of said pinions in its respective set.

17. The combination claimed in claim 2, wherein said last mentioned means comprises a plurality of groups of intermittent gears driven by said drive shaft, a plurality of sets of pinions shiftably arranged with respect to said intermittent gears, one of said pinions in each constituting a means for initiating the actuating movement of its associated set of pinions, adapted to cooperate with different teeth on its cooperating intermittent gear in its respective group, said last-mentioned intermittent gear having three laterally disposed series of teeth upon the periphery thereof corresponding to the said three kinds of operation, a second one of said pinions in each set constituting an actuating pinion adapted to selectively cooperate with different intermittent gears in its respective group, actuating teeth upon said gears in each group adapted to be brought into engagement with said second pinion in each set by the movement of said first pinion in each set, variably disposed upon the peripheries of said intermittent gears in each group, and a transmission gear permanently in engagement with a third one of said pinions in the respective set.

18. The combination claimed in claim 2, wherein said last mentioned means comprises a plurality of groups of intermittent gears driven by said drive shaft, a plurality of sets of pinions shiftably arranged with respect to said intermittent gears, one of said pinions in each set constituting a means for initiating the actuating movement of the pinions, adapted to cooperate with different groups of teeth on its cooperating intermittent gear, said last-mentioned intermittent gear having three series of tripping teeth upon the periphery thereof corresponding to the said three kinds of operation, each series of said teeth arranged in adjacent planes perpendicular to the axis of the gear, a second one of said pinions in each set constituting an actuating pinion adapted to selectively cooperate with different intermittent gears in each group, two groups of actuating teeth upon each of said intermittent gears adapted to be brought into engagement with said second pinion in each set by the movement of said first pinion in each set and impart to said second pinion two rotary steps of motion in the same direction, and a transmission gear permanently in engagement with a third one of said pinions in its respective set.

ERNST BREITLING.